United States Patent Office 3,560,281
Patented Feb. 2, 1971

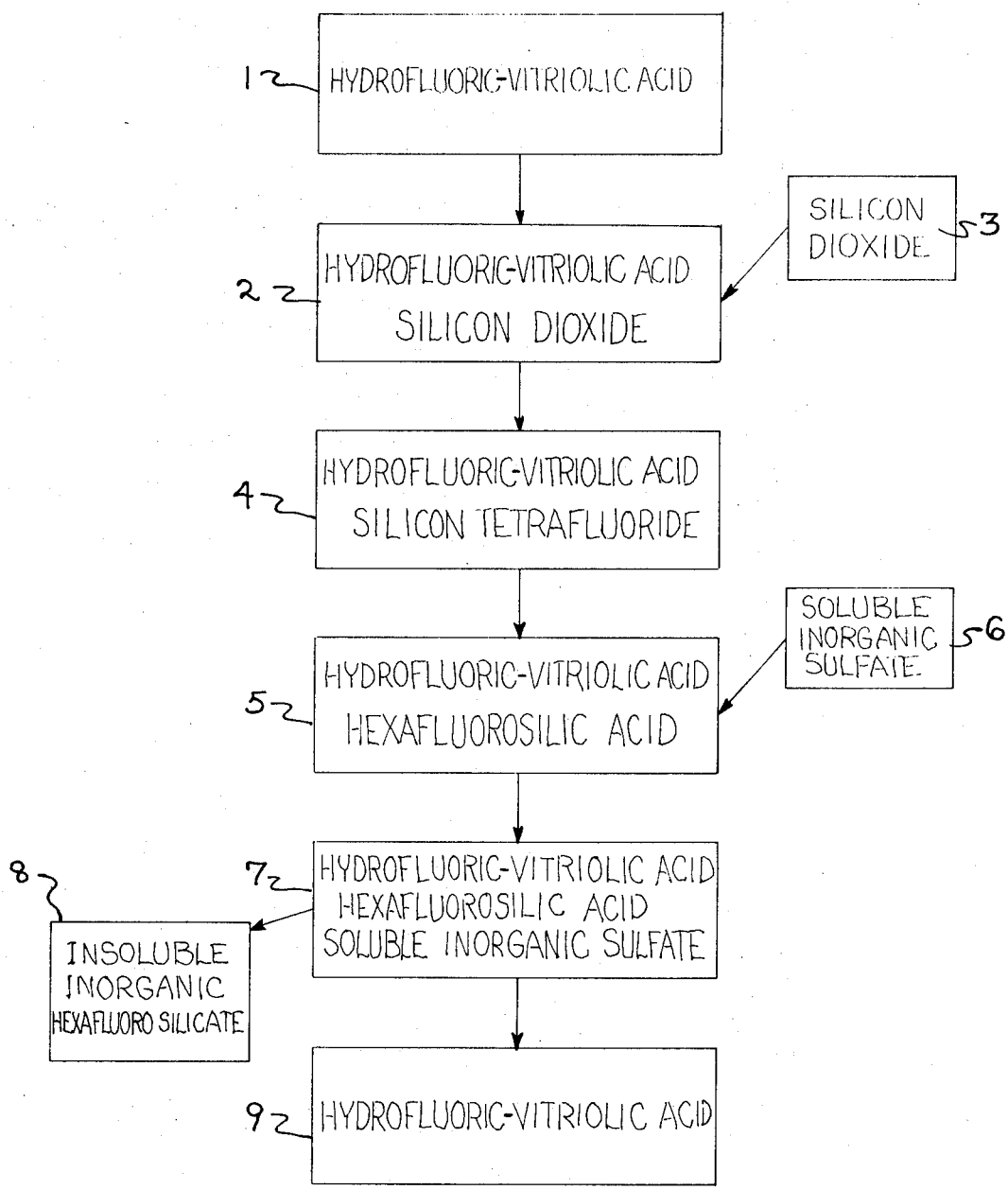

3,560,281
PROCESS FOR REGENERATING AN ACID BATH
Cecil R. Nelson, Ashville, Ohio, assignor to Owens-Illinois, Inc., a corporation of Ohio
Filed Oct. 2, 1967, Ser. No. 672,027
Int. Cl. C03c 15/00
U.S. Cl. 156—24    6 Claims

ABSTRACT OF THE DISCLOSURE

A process for regenerating a glass treating acid bath containing a mixture of hydrofluoric acid and sulfuric acid by adding to said bath an aqueous soluble inorganic sulfate salt to precipitate a glass reaction product and to regenerate the bath.

INTRODUCTION

The present invention pertains to a novel process for the regeneration of a chemical acid bath. More particularly, the instant invention relates to regeneration of a hydrofluoric acid, sulfuric acid glass etching or polishing bath to prolong the useful life of said bath. Specifically, the invention is concerned with economically lengthening the life of a mixed hydrofluoric acid, sulfuric acid polishing bath by adding to said bath soluble inorganic sulfate salts to precipitate unwanted fluosilicic acid.

BACKGROUND OF THE INVENTION

In the present day commercial production of glass cathode-ray tubes, especially television tubes, the glass surfaces produced often have objectionable and undesirable high levels of specular reflection characteristics. To reduce the high specular reflection on the glass surfaces of television faceplates and thereby essentially eliminate distraction by images reflected by the smooth surface of the glass, manufacturers of television faceplates break up the reflections by roughening said glass surface. The roughening of said glass surface is conventionally accomplished by repeatedly dipping or immersing the glass article of science and commerce into a hydrofluoric acid-sulfuric acid etching bath for a sufficient length of time to cause the glass surface to be changed physically and chemically to substantially reduce or essentially eliminate the unwanted specular reflectance.

Also, the sealable edges of color television picture bulb parts, such as the sealing edges of faceplates and the complemental sealing edges of television funnels, are acid etched to produce sealable edges by substantially eliminating micro-flaws, pits, rough edges and the like prior to assembly of the sealable surfaces.

The use of a mixed hydrofluoric acid-sulfuric acid etching or polishing bath, for the above purposes, is often accompanied with a serious problem. This problem is the formation of unwanted hydrofluosilicic acid, $H_2SiF_6$. The hydrofluoric acid (HF) of the acid etching bath reacts with the silicon dioxide ($SiO_2$) present in glass to form silicon tetrafluoride ($SiF_4$). The tetrafluoride reacts with more hydrofluoric acid to form hydrofluosilicic acid. The immediately described reaction can be represented by the following inorganic equations:

$$4HF + SiO_2 \rightarrow SiF_4 + 2H_2O$$

$$SiF_4 + 2HF \rightarrow H_2SiF_6$$

The presence of hydrofluosilicic acid in the bath is a serious problem because its unwanted presence decreases the concentration of free hydrofluoric acid, it slows the etching rate, it lessens the initial hydrofluoric acid level and it does not possess any etching property. Thus, to effectively control the desired level and activity of hydrofluoric acid and lengthen the useful and economical life of the hydrofluoric acid etching bath, it is necessary to remove or effectively eliminate some of the unwanted hydrofluosilicic acid.

Accordingly, it is a purpose of the present invention to provide a novel means for lengthening and increasing the usable life of an acid etching bath for glass treatment.

Another purpose of the present invention is to increase the useful life of an acid bath by adding to the bath soluble, inorganic compound.

Yet a further purpose of the instant invention is to prolong the economical life of a hydrofluoric acid etching bath by substantially precipitating hexafluorosilicic acid formed in the bath by the reaction of the glass with hydrofluoric acid.

Still a further purpose of this invention is to effectively precipitate hexafluorosilicic acid by intimately reacting said acid with a soluble cationic sulfate compound.

Yet still a further purpose of the present invention is to provide an improved acid bath adapted to treating glass surfaces to both facilitate thin vacuum sealing and to provide low light reflectance.

Still a further purpose of this invention is to provide a process for substantially eliminating hexafluorosilicic acid from an etching acid bath containing mixtures of hydrofluoric acid and sulfuric acid.

Still a further purpose of this invention is to prolong the life of a hydrofluoric-vitriolic acid bath by adding to the bath a cationic sulfate to substantially eliminate unwanted fluosilicic acid.

Other purposes and features of this invention will become readily apparent from the following detailed description of the manner and mode of practicing the invention.

SUMMARY OF THE INVENTION

In attaining the purposes of the present invention, it has now been surprisingly found that the useful life of a fluorine, particularly a mixed hydrofluoric-sulfuric acid containing acid etching bath can be increased by adding to the bath inorganic sulfates to precipitate hydrofluorosilicic acid ($H_2SiF_6$). Hydrofluorosilicic acid, formed by etching selected surfaces of glass articles of science and commerce with hydrofluoric acid, has a molecular weight of 144.08, and it is also known to the art as fluosilicic acid, hexafluorosilicic acid and silicofluoric acid.

The salts employed for regenerating a mixed acid bath are generally aqueous soluble, inorganic sulfate salts. The presently preferred sulfate salt is aluminum sulfate $Al_2(SO_4)_3$. Aluminum sulfate reacts with hydrofluorosilicic acid at room temperature and readily forms a precipiate which is not harmful to the operation of the acid bath. The precipitation of hydrofluorosilicic acid by aluminum sulfate regenerates the bath and the precipitation can be represented by the following equation:

$$Al_2(SO_4)_3 + 3H_2SiF_6 \rightarrow Al_2(SiF_6)_3\downarrow + H_2SO_4$$

Exemplary of other sulfates that can be employed for the purpose of the present invention are rubidium sulfate and other like commercially available sulfates that are generally aqueous, soluble and form insoluble fluosilicate. Usually, the sulfates are added to the acid bath in an amount of about 0.75 to 2.5 pounds per gallon of acid bath. The presently preferred range is about 1 to 1.5 pounds per gallon of acid bath, with the presently operative amount of about 1 pound per gallon of acid bath.

The following examples are representative of the mode and manner of performing the subject invention and they are not to be construed as limiting the scope of the invention.

EXAMPLE I

A 6 gallon polishing acid bath consisting of 3.5 parts by volume of 70% hydrofluoric acid and 1 part by volume of 66% Bé.° sulfuric acid was used 3 to 4 hours for polishing the complemental edges of faceplates and glass funnels for cathode-ray tube envelopes. After this time, there was a buildup of hydrofluosilicic acid which reduced the desired polishing ability of the bath. To the bath was then added approximately 1 pound per gallon of total acid of aluminum sulfate which precipitated the hydrofluosilicic in the form of insoluble aluminum hexafluorosilicic acid $Al_2(SiF_6)_3$. The precipitate which settled on the bottom of the tank was then drained off or removed as by filtering to prolong the useful life of the polishing bath. The bath was used for an additional 3 to 4 hours for polishing the sealing edges of glass color television faceplates and funnels.

EXAMPLE II

The regeneration of an acid fortification acid bath was performed as follows: to an acid bath containing a mixture of sulfuric acid and hydrofluoric acid that was used for polishing the sealing edges of television faceplates for 6 hours was added 4 pounds aluminum sulfate, about the equivalent of 1 pound of sulfate per 1½ gallons of acid, and the bath was continued in use for another 5½ hours. The addition of the sulfate regenerated the bath and increased its useful operating life to 11½ hours instead of the normal life of 4 to 6 hours.

EXAMPLE III

The procedure set forth in Example II was used for the purpose of the present example. The reagents and polishing conditions were as set forth above, except, that the aluminum sulfate was added at hourly and bi-hourly intervals instead of adding it in a large mass. For example, the sulfate salt was added at 1, 3, 5, and 6 hour intervals after the start of the polishing operation, and the periodic additions at spaced intervals precipitated the newly-formed hydrofluosilicic acid and concurrently therewith prolonged the useful life of the bath.

Other compounds were tried to precipitate hydrofluosilicic acid, for example, potassium fluoride but it did not produce the desired objective, as, the potassium fluoride reacted with the sulfuric acid in the bath and produced potassium sulfate leaving hydrofluosilicic acid apparently undisturbed and unreacted. Similarly, potassium carbonate was tried for regenerating the bath but unacceptable results were obtained seemingly due to the liberation of carbon dioxide. Thus, the above results are seen to demonstrate that an acid-fortifying bath can be regenerated by the addition of soluble inorganic sulfates without any apparent adverse effects on the glass treatment process.

In the present case, the abbreviation Bé.° refers to Baumé degrees. The density of sulfuric acid is often reported in degrees. Baumé according to the formula $$Bé.° = 145 - (145/sp.\ gr.)$$

A 66° Bé.° sulfuric acid has a sp. gr. of 1.8354 and is 93.19% $H_2SO_4$.

The examples set forth above list a typical mixed hydrofluoric acid-sulfuric acid etching bath and it is to be understood that the disclosed invention is not limited to the above-mixtures as other acid mixtures, such as 80% hydrofluoric acid; 40% sulfuric acid; 50% hydrofluoric acid; 50% sulfuric acid; and the like will be obvious to those versed in the present art.

In a continuous etching process, the acid solution can be circulated through a filtering apparatus and the insoluble precipitates removed thereby with the regenerated acid mixture returned to the bath for prolonged and economical etching of glass articles of science and commerce.

The mixed acid bath of the present invention has been used successfully for polishing the flat planar sealing edges of glass color television picture tubes, mainly, faceplates and funnels, and it could of course be successfully employed for etching or polishing other glass items such as sheet glass, light bulbs and the like.

In the accompanying flow diagram there is set forth the process of the invention. In the process a mixture 1 of hydrofluoric acid and vitriolic acid are in a bath. Next, silicon dioxide 3 accumulates in the bath 2 produced by the etching of glass and as it accumulates, it combines with the hydrofluoric acid in the bath to form silicon tetrafluoride 4, which further acts with more hydrofluoric acid to produce hexafluorosilic acid 5. Next, a soluble inorganic sulfate 6 is added to the bath to act with hexafluorosilic acid 7 to precipitate hexafluorosilic acid as hexafluorosilicate 8 to essentially restore the bath 9 to its mixed hexafluoric acid vitriolic acid state.

While the illustrative embodiments of the invention have been described with particularily, it will be readily understood that various modifications will be self-apparent and can readily be made by those skilled in the art without departing from the scope and spirit of the invention.

What is claimed is:

1. A process for regenerating and prolonging the useful life of a glass acid etching bath wherein said process consists essentially of adding to said etching bath containing 50% to 80% hydrofluoric acid and 40% to 66% Be'° sulfuric acid, 0.75 to 2.5 pounds per gallon of acid bath of an inorganic aqueous soluble sulfate to essentially precipitate hydrofluosilicic acid formed during the etching of glass and thereby regenerate said acid bath and to increase the useful operating life of the bath to 11½ hours.

2. A process according to claim 1 wherein said sulfate is aluminum sulfate.

3. A process according to claim 1 wherein said concentration of the sulfate is about 1 to 1.5 pounds per gallon of acid in said bath.

4. A process according to claim 1 wherein said sulfate is added in successive amounts to substantially maintain the original concentrations of hydrofluoric and sulfuric acid.

5. A process according to claim 1 wherein the hydrofluosilicic acid is precipiated as an insoluble silicofluoride.

6. A process according to claim 1 wherein the insoluble silicofluoride is aluminum silicohexafluoride and wherein the insoluble silicohexafluoride is removed by filtration.

References Cited

UNITED STATES PATENTS

| | | | |
|---|---|---|---|
| 2,173,923 | 9/1939 | Teal | 156—24X |
| 2,989,384 | 6/1961 | Allen et al. | 156—24 |
| 2,999,013 | 9/1961 | Meth | 156—6 |

JACOB H. STEINBERG, Primary Examiner

U.S. Cl. X.R.

156—19; 252—79.3